United States Patent [19]
Kitagawa

[11] Patent Number: 5,831,418
[45] Date of Patent: Nov. 3, 1998

[54] STEP-UP/DOWN DC-TO-DC CONVERTER

[75] Inventor: Seiya Kitagawa, Kawasaki, Japan

[73] Assignee: Fujitsu Ltd., Kawasaki, Japan

[21] Appl. No.: 889,873

[22] Filed: Jul. 8, 1997

[30] Foreign Application Priority Data

Dec. 3, 1996 [JP] Japan .................................... 8-323199

[51] Int. Cl.[6] ...................................................... G05F 1/10
[52] U.S. Cl. .......................................... 323/222; 323/266
[58] Field of Search ................................... 323/222, 266, 323/282; 363/21, 78, 123

[56] References Cited

U.S. PATENT DOCUMENTS

| | | | |
|---|---|---|---|
| 5,572,112 | 11/1996 | Saeki et al. | 323/222 |
| 5,627,459 | 5/1997 | Itoyama et al. | 323/283 |
| 5,721,483 | 2/1998 | Kolluri et al. | 323/222 |

FOREIGN PATENT DOCUMENTS 9-9613  1/1997  Japan .

*Primary Examiner*—Stuart N. Hecker
*Attorney, Agent, or Firm*—Staas & Halsey

[57] ABSTRACT

A converter for converting a DC voltage not stabilized, such as the terminal voltage of a battery, into a stable DC voltage, comprising a voltage comparison unit (2 in FIG. 1) and an operation changeover control unit (3). The voltage comparison unit (2) compares an input voltage and an output voltage. The operation changeover control unit (3) controls the changeover of the operations of the DC/DC converter (1) so that the DC/DC converter (1) may perform a step-down operation as the operation of a step-down type converter when the input voltage is higher than the output voltage as the result of the comparison, and that it may perform a step-up operation as the operation of a step-up type converter when the output voltage is higher than the input voltage. Thus, losses in the smoothing reactor and smoothing capacitor of the step-up/down converter are suppressed to enhance the efficiency thereof.

12 Claims, 22 Drawing Sheets

| OUTPUTS OF CMPS | | CONTROL FOR SW(1) | CONTROL FOR SW(2) | OPERATIONAL STATE |
|---|---|---|---|---|
| CMP(1) | CMP(2) | CMP1+CMP2 | CMP1*CMP2 | |
| H | H | H | H | STEP-UP OPERATION |
| L | H | H | L | STEP-UP OPERATION |
| H | L | H | L | STEP-DOWN OPERATION |
| L | L | L | L | STEP-DOWN OPERATION |

F I G. 4

| | PULSE VANISHMENT DETECTING PORTION | OUTPUT OF CMP (1) | PULSE WIDTH DETECTOR |
|---|---|---|---|
| DUTY=0% | H | L | L |
| DUTY 0%→UP | L | X | L |
| DUTY 100%→DOWN | L | X | H |
| DUTY=100% | H | H | H |

FIG. 12

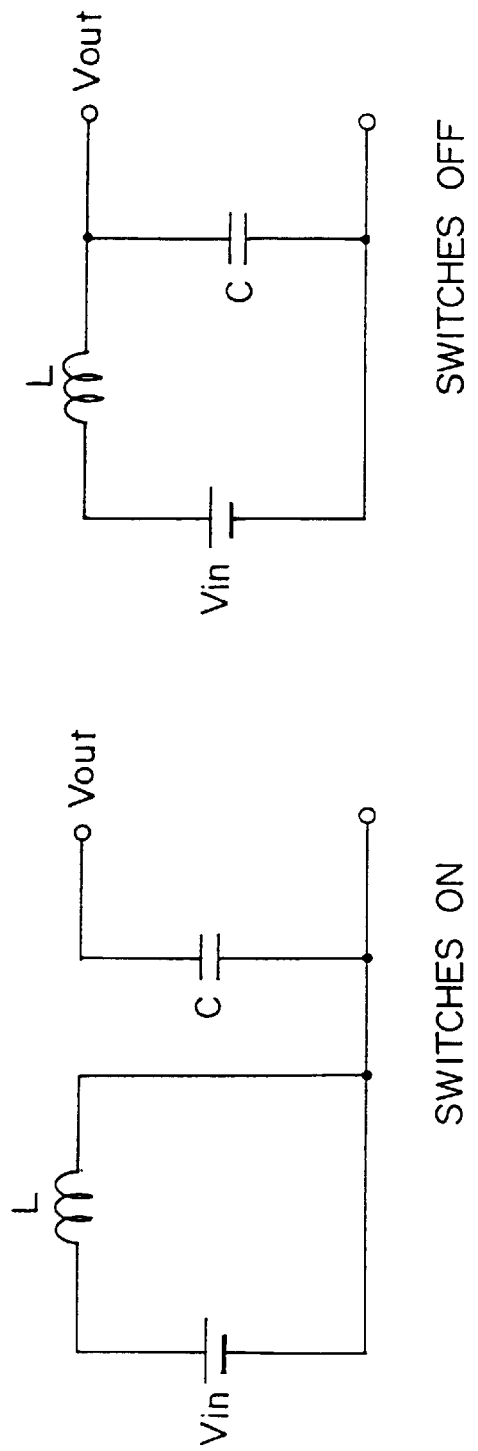
FIG. 22B  SWITCHES OFF
FIG. 22A  SWITCHES ON

STEP-UP/DOWN DC-TO-DC CONVERTER

BACKGROUND OF THE INVENTION

1. Field of the Invention

The present invention relates to the construction of a switching power source. More particularly, it relates to the circuit arrangement of a switching converter which is extensively used as the power source of portable equipment, for example, notebook personal computer permitting battery drive, that is, a DC-to-DC (also expressed as "DC/DC" below) converter which converts the unstable DC (direct-current) voltage of a battery or the like into a stable DC voltage.

2. Description of the Related Art

An apparatus requiring battery drive needs, in general, to cope with both the drive of the apparatus with a battery and the operation thereof with an AC (alternating-current) power source, in other words, the drive thereof with an AC adaptor. An example of use of a DC/DC converter in such a case is illustrated in FIG. 14 of the accompanying drawings.

In the example of FIG. 14, it is assumed that the output voltage of the DC/DC converter 51 be +5 [V], that the output voltage of the AC adaptor 52 be +16 [V], and that the voltage of the battery 53 vary within a range of 4 [V] to 9 [V] inclusive. Then, the varying range of the converter input voltage from the battery 53 contains the value of the converter output voltage therein, and the input voltage becomes both higher and lower relative to the output voltage. Therefore, the converter cannot be constructed as either a so-called "step-down type" or a so-called "step-up type", and a "step-up/down type" capable of both step-up and step-down needs to be employed therefor.

FIG. 15 illustrates the circuit arrangement of a prior-art DC/DC converter of the step-up/down type. Referring to the figure, the converter is constructed of a smoothing reactor L at numeral 60, a smoothing capacitor C at numeral 61, two switches (1) at numeral 62 and (2) at numeral 63, two diodes (1) at numeral 64 and (2) at numeral 65, an error amplifier 66 which compares the output voltage Vout of this converter with, for example, a predetermined reference voltage and then amplifies an error resulting from the comparison, an oscillator 67 which generates a triangular voltage by way of example, and a comparator 68 which compares the outputs of the error amplifier 66 and the oscillator 67 and then delivers a signal for turning ON the switch (1) 62 and the switch (2) 63 in a case, for example, where the output of the error amplifier 66 is larger than that of the oscillator 67.

With the step-up/down type DC/DC converter, energy to be stored in the smoothing reactor L 60 is adjusted by simultaneously turning ON or OFF the two switches (1) 62 and (2) 63. More specifically, energy stored in the reactor L while the two switches are ON is smoothed by the smoothing capacitor C 61, and a stable DC voltage is supplied as the output $V_{out}$. The two diodes (1) 64 and (2) 65 serve to commutate the stored energy of the smoothing reactor L 60 to the smoothing capacitor C 61 while the two switches (1) 62 and (2) 63 are OFF.

FIG. 16 is a diagram for explaining the ON/OFF signal which is applied to the two switches (1) 62 and (2) 63 shown in FIG. 15. Referring to FIG. 16, in each interval in which the output of the error amplifier 66 is higher than the oscillation voltage delivered from the oscillator 67, the comparator 68 turns ON the ON/OFF signal for the two switches (1) 62 and (2) 63, so that these switches are turned ON in the interval. Incidentally, symbol $t_s$ in the figure indicates the oscillation cycle of the oscillator 67, and symbol $t_{on}$ the ON time period of each switch.

FIGS. 17A and 17B are diagrams for explaining the respective operations of the step-up/down type converter in FIG. 15, during the ON time period and OFF time period of the switches (1) 62 and (2) 63. FIG. 17A corresponds to the case where the two switches are turned ON. The smoothing reactor L 60 is fed with current $I_L$ from the input voltage ($V_{in}$) side of the converter, and the energy is stored in the reactor. On this occasion, an output current ($I_o$ indicated in FIG. 15) is supplied as the discharging current of the smoothing capacitor C 61.

On the other hand, FIG. 17B corresponds to the case where the two switches are turned OFF. On this occasion, current $I_L$ from the smoothing reactor L 60 becomes the charging current of the smoothing capacitor C 61, and part of the current $I_L$ is supplied as an output current ($I_o$) to the output voltage ($V_{out}$) side of the converter.

A variation $\Delta I_{Lon}$ in the current flowing through the smoothing reactor L 60 during the ON time period ($t_{on}$) of the two switches in FIG. 15, and a variation $\Delta I_{Loff}$ in the current during the OFF time period ($t_{off}$) of the switches are respectively given by the following equations:

$$\left. \begin{array}{l} \Delta I_{Lon} = V_{in} \cdot t_{on}/L \\ \Delta I_{Loff} = V_{out} \cdot t_{off}/L \end{array} \right\} \qquad (1)$$

When the variations $\Delta I_{Lon}$ and $\Delta I_{Loff}$ are equalized, the output voltage $V_{out}$ of the converter is given by the following equation (2), and the ON time period $t_{on}$ of the switches is given by the following equation (3):

$$V_{out} = V_{in} \cdot t_{on}/(t_s - t_{on}) \qquad (2)$$

$$t_{on} = V_{out} \cdot t_s/(V_{in} + V_{out}) \qquad (3)$$

FIG. 18 is a diagram for explaining the currents which flow through the smoothing reactor L 60 in FIG. 15. Assuming in the diagram of FIG. 18 that the currents vary rectilinearly, the current $I_{Lon}$ during the ON time period $t_{on}$ of the switches is given by the following equation (4), and the current $I_{Loff}$ during the OFF time period $t_{off}$ of the switches is given by the following equation (5):

$$I_{Lon} = V_{in} \cdot t/L + I_{cont} \qquad (4)$$

$$I_{Loff} = -V_{out} \cdot t/L + B \qquad (5)$$

The output current $I_{out}$ of the converter becomes equal to the average value of a hatched portion in FIG. 18. That is, the discharging current which flows from the smoothing capacitor C 61 in FIG. 15 during the ON time period $t_{on}$ of the switches becomes the output current $I_{out}$, while a part which is obtained by subtracting the output current $I_{out}$ from the hatched portion in FIG. 18 during the OFF time period $t_{off}$ becomes the charging current of the capacitor C 61. The current replenished by the charging comes to correspond to the output current during the ON time period of the switches. Accordingly, the output current $I_{out}$ is given by the following equation (6):

$$I_{out} = \frac{1}{2} \times (I_{Lpeak} + I_{cont}) (t_s - T_{on})/t_s \qquad (6)$$

The peak value $I_{Lpeak}$ of the current which flows through the reactor. L 60 is given by the following equation (7) in view of Eq. (4), and the output current $I_{out}$ is given by the following equation (8) by substituting Eq. (7) into Eq. (6):

$$I_{Lpeak}=V_{in} \cdot t_{on}/L + I_{cont} \quad (7)$$

$$I_{out}=\tfrac{1}{2} \times (V_{in} \cdot t_{on}/L + 2I_{cont})(t_s - t_{on})/t_s \quad (8)$$

The minimum value $I_{cont}$ of the current which flows through the reactor L 60 is given by the following equation (9) in view of Eq. (8), and the variation of the current, namely, the ripple $\Delta I_L$ is given by the following equation (10):

$$I_{cont} = I_{out} \cdot t_s/(t_s - t_{on}) - V_{in} \cdot t_{on}/2L \quad (9)$$

$$\Delta I_L = V_{in} \cdot t_{on}/L \quad (10)$$

Next, the circuit arrangement and operation of a prior-art DC/DC converter of the step-down type will be explained for comparison's sake. FIG. 19 is a diagram for explaining the prior-art example of construction. Referring to the figure, the converter is constructed of a smoothing reactor L 70, a smoothing capacitor C 71, a switch 72, a diode 73, an error amplifier 74, an oscillator 75 and a comparator 76.

FIGS. 20A and 20B are diagrams for explaining the operations of the prior-art converter in FIG. 19 during the ON time period and OFF time period of the switch 72, respectively. During that ON time period of the switch 72 to which FIG. 20A corresponds, a load current and a charging current for the smoothing capacitor C 71 are supplied through the smoothing reactor L 70 by the input voltage $V_{in}$ of the converter.

During that OFF time period of the switch 72 to which FIG. 20B corresponds, current flowing through the smoothing reactor L 70 is supplied to the output voltage ($V_{out}$) of the converter, instead of the current afforded from the input voltage ($V_{in}$) side.

As in the case of the step-up/down type converter, the variation $\Delta I_{Lon}$ of the current during the ON time period $t_{on}$ of the switch 72 and the variation $\Delta I_{Loff}$ of the current during the OFF time period $t_{off}$ are respectively given as follows:

$$\left. \begin{array}{l} \Delta I_{Lon} = (V_{in} - V_{out})t_{on}/L \\ \Delta I_{Loff} = V_{out} \cdot t_{off}/L \end{array} \right\} \quad (11)$$

When these variations are equalized, the output voltage $V_{out}$ of the converter and the ON time period $t_{on}$ of the switch 72 are respectively given by the following equations (12) and (13):

$$V_{out} = V_{in} \cdot t_{on}/t_s \quad (12)$$

$$t_{on} = V_{out} \cdot t_s/V_{in} \quad (13)$$

The peak value $I_{Lpeak}'$ minimum value $I_{cont}'$ and ripple value $\Delta I_L'$ of the current flowing through the reactor L 70 are given as follows, by conducting calculations similar to those in the case of the step-up/down type converter:

$$I_{Lpeak}' = (V_{in} - V_{out})t_{on}/L + I_{cont}' \quad (14)$$

$$I_{cont}' = I_{out} - (V_{in} - V_{out})t_{on}/2L \quad (15)$$

$$\Delta I_L' = (V_{in} - V_{out})t_{on}/L \quad (16)$$

By the way, the minimum current value of Eq. (15) is stated in the following book:

Akira Hasegawa: "Know-how of Design of Switching regulator (7th Version)" published by CQ Shuppan-sha in Tokyo, P. 20, Eq. (1–22)

Lastly, a prior-art example of a step-up type converter will be briefly described. FIG. 21 is a connection diagram showing the example of construction of the step-up type converter, while FIGS. 22A and 22B are diagrams for explaining the operations of the step-up type converter during the ON time period and OFF time period of a switch (82 in FIG. 21). In the exemplified step-up type converter, a variation $\Delta I_{Lon}$, in current during the ON time period $t_{on}$ of the switch 82 and a variation $\Delta I_{Loff}$ in current during the OFF time period $t_{off}$ thereof are respectively given by the following equations (17), and the output voltage $V_{out}$ of the converter and the ON time period $t_{on}$ of the switch 82 are respectively given by the following equations (18) and (19) by equalizing the variations $\Delta I_{Lon}$ and $\Delta I_{Loff}$:

$$\left. \begin{array}{l} \Delta I_{Lon} = V_{in} \cdot t_{on}/L \\ \Delta I_{Loff} = (V_{out} - V_{in})t_{off}/L \end{array} \right\} \quad (17)$$

$$V_{out} = V_{in} \cdot t_s/(t_s - t_{on}) \quad (18)$$

$$t_{on} = (V_{out} - V_{in})t_s/V_{out} \quad (19)$$

In the example of FIG. 14, it is only when the battery 53 has consumed down to its output voltage lower than 5 [V] that the input voltage to the DC/DC converter 51 becomes lower than the output voltage from this converter. Except for such a case, the step-down type may be used for the DC/DC converter. Therefore, the currents which flow through the smoothing reactors will now be compared as to the cases of employing the step-up/down type shown in FIG. 15 and the step-down type shown in FIG. 19. Here, the following case shall be assumed as conditions:

$V_{in}=16$ [V] $V_{out}=5$ [V] $I_{out}=3$ [A]

$t_s=5$ [$\mu s$] L=33 [$\mu H$]

Using Eqs. (7) and (10) for the step-up/down type and Eqs. (14) and (16) for the step-down type, the peak values and ripple values of the currents flowing through the reactors L are respectively calculated as follows:

Step-up/down type: $I_{Lpeak}=4.23$ [A] $\Delta I_L=0.58$ [A]

Step-down type: $I_{Lpeak}'=3.26$ [A] $\Delta I_L'=0.26$ [A]

According to the calculated results, the peak value of the current flowing through the reactor L in the step-up/down type becomes about 1.3 times greater than in the step-down type, and the ripple value in the step-up/down type becomes about 2 times greater than in the step-down type. The use of the step-up/down type converter therefore poses the problem that losses in the smoothing reactor and the smoothing capacitor become heavier than in the step-down type, resulting in an inferior efficiency. In general, the value of a peak current which flows through a smoothing reactor (80 in FIG. 21) in the step-up type converter is the same as in the step-up/down type converter. Moreover, as explained in conjunction with FIG. 14, in spite of the appellation of the step-up/down type converter, the time period during which this converter is to perform the step-down operation is much longer than the time period during which it is to perform the step-up operation, and the step-up operation is slightly utilized only when the battery 53 has run down. Considering these facts, the efficiency of the prior-art step-up/down type converter inferior to that of the step-down type converter is a serious problem.

SUMMARY OF THE INVENTION

The present invention has for its object to provide a DC/DC converter in which, when an input voltage is higher than an output voltage in a step-up type DC/DC converter, losses in a smoothing reactor and a smoothing capacitor are minimized to attain a high efficiency.

In order to accomplish the object, the present invention is so constructed that, when the input voltage is higher than the output voltage as the result of the comparison between the input and output voltages, an operation similar to the operation of a step-down type DC/DC converter in the prior art is performed, and that, when the output voltage is higher than the input voltage, the operation of the step-up type DC/DC converter is performed.

In the present invention, the step-up operation and the step-down operation can also be changed-over by replacing the direct comparison between the input voltage and the output voltage, with the comparison between a set voltage correspondent to the input voltage and the output voltage, the comparison between the input voltage and a set voltage correspondent to the output voltage, the comparison between the input voltage endowed with an offset and the output voltage, or the comparison between the input voltage and the output voltage endowed with an offset.

Further, the present invention can be so constructed that an error developing between an output voltage and a reference voltage is compared with the oscillation voltage of a certain oscillator in a step-up/down DC/DC converter, and that the operation of the converter is controlled so as to start the step-down operation when the duty factor of a pulse wave delivered in correspondence with the difference of the comparison has reached 0 [%] and to start the step-up operation when the duty factor has reached 100 [%].

BRIEF DESCRIPTION OF THE DRAWINGS

FIG. 4 is a diagram for explaining the operational states of the converter dependent upon the output logical levels of two comparators which are included in the first embodiment;

FIG. 12 is a diagram showing the operational truth table of the pulse width detector in FIG. 11;

FIGS. 22A and 22B are diagrams for explaining the operations of the step-up type converter in FIG. 21.

DESCRIPTION OF THE PREFERRED EMBODIMENTS

Figure 1:
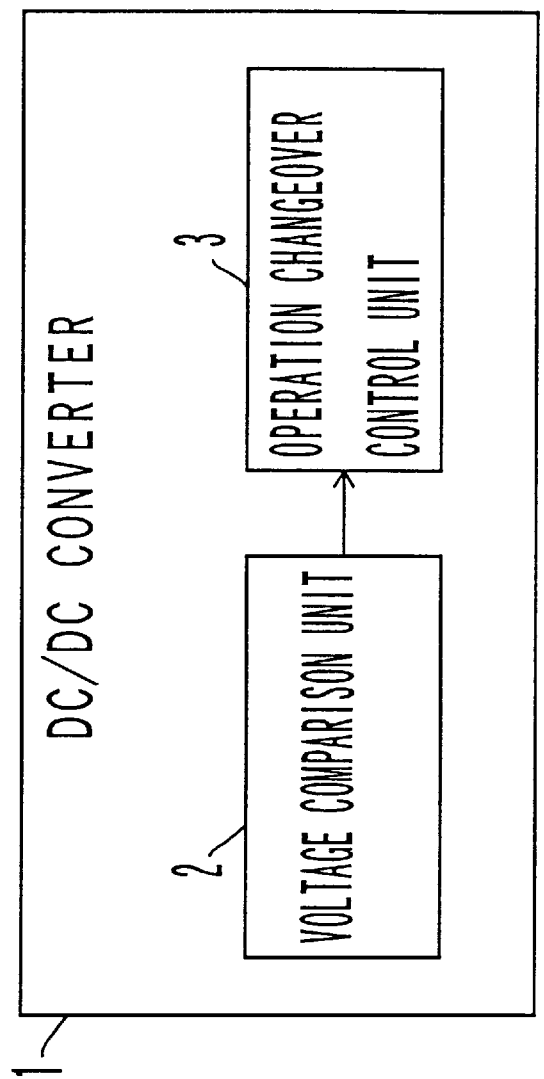
FIG. 1 is a block diagram for elucidating the principle of the present invention.

FIG. 1 is a block diagram showing the fundamental construction of the present invention. The figure illustrates the principle of a step-up/down DC/DC converter which requires both the operations of step-up and step-down for the reason that the varying range of an input voltage not stabilized, for example, the terminal voltage of a battery contains therein the value of a stabilized voltage to-be-output.

Referring to FIG. 1, the step-up/down DC/DC converter 1 includes a voltage comparison unit 2 and an operation changeover control unit 3 therein. The voltage comparison unit 2 compares the input voltage to the converter 1, with the output voltage from the converter 1. The operation changeover control unit 3 controls the changeover between the operations of the step-up/down DC/DC converter 1 so that the converter 1 may perform the operation of step-down type, namely, the step-down operation when the result of the comparison of the voltage comparison unit 2 indicates that the input voltage of the converter 1 is higher than the output voltage thereof, and that it may perform the operation of step-up type, namely, the step-up operation when the result of the comparison indicates that the output voltage of the converter 1 is higher than the input voltage thereof.

Such a step-up/down DC/DC converter is furnished with a first switch between the voltage input terminal and smoothing reactor of the converter, and a second switch between the earth or ground and the node of the smoothing reactor near to the voltage output terminal of the converter. The first and second switches correspond to the switch (1) 62 and switch (2) 63 in the prior-art example of FIG. 15, respectively.

The operation changeover control unit 3 executes the control so that the second switch may become normally OFF in the step-down operation, whereas the first switch may become normally ON in the step-up operation. Thus, in the step-down operation, the switch (1) 62 turns ON or OFF, thereby to execute operations similar to those of the step-down type converter explained in conjunction with FIGS. 20A and 20B. On the other hand, in the step-up operation, the switch (2) 63 turns ON or OFF, thereby to realize the operations of the step-up type converter explained in conjunction with FIGS. 22A and 22B.

Figure 2:
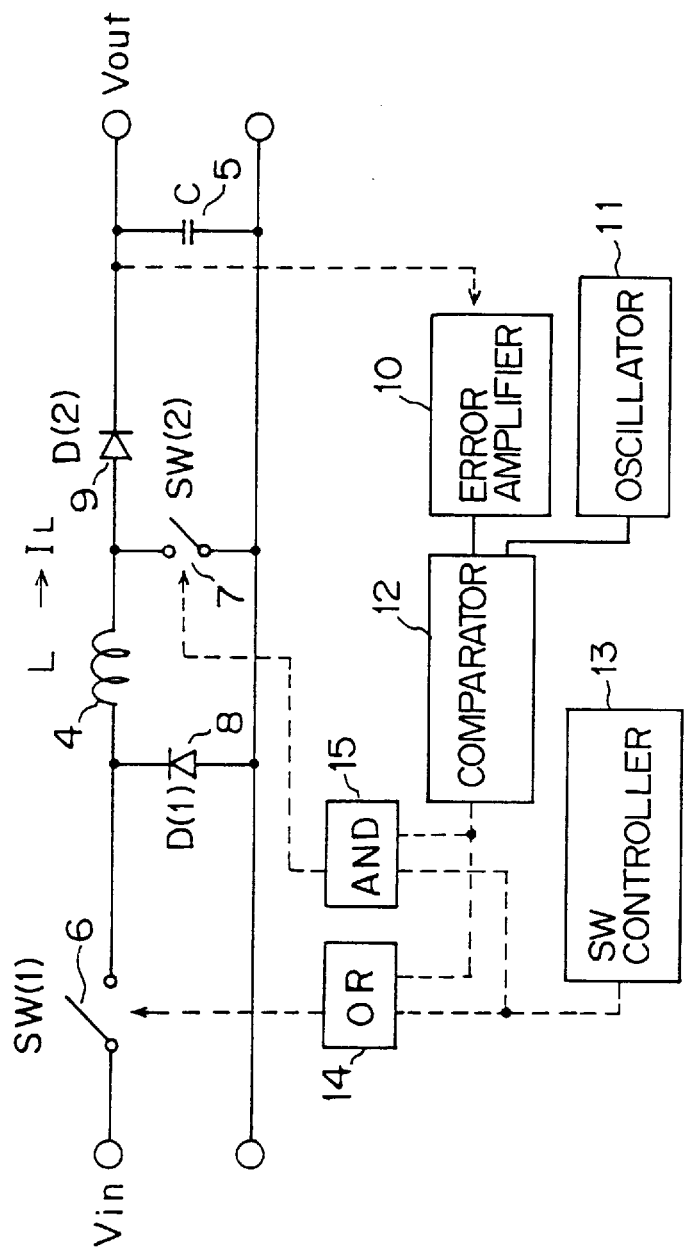
FIG. 2 is a block diagram showing the fundamental construction of a step-up/down DC/DC converter according to the present invention.

FIG. 2 is a block diagram showing the fundamental construction of the step-up/down DC/DC converter according to the present invention. As compared with the prior-art system shown in FIG. 15, the construction shown in FIG. 2 includes a switch controller 13, an OR gate 14 and an AND gate 15 anew, besides constituents similar to those in FIG. 15, that is, a smoothing reactor L 4, a smoothing capacitor C 5, two switches (1) 6 and (2) 7, two diodes (1) 8 and (2) 9, an error amplifier 10, an oscillator 11 and a comparator 12.

Figures 20A, 20B:
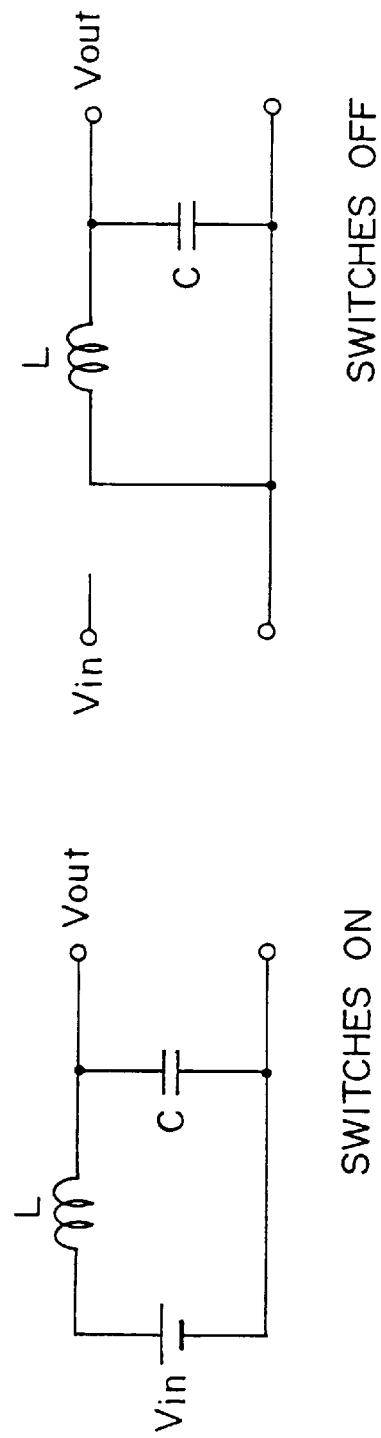
FIGS. 20A and 20B are diagrams for explaining the operations of the step-down type converter in FIG. 19.
Figure 21:
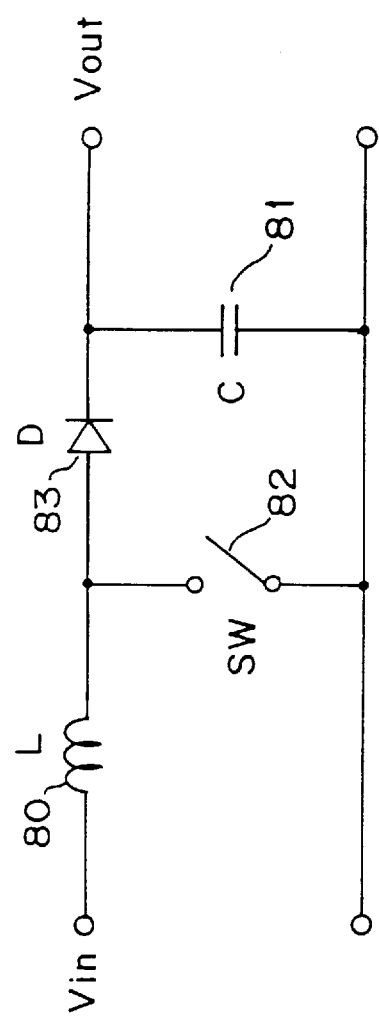
FIG. 21 is a diagram showing an example of construction of a step-up type converter in the prior art.

In the circuit arrangement of FIG. 2, the switch controller 13 delivers an "L" (low) level when the input voltage $V_{in}$ of the converter is higher than the output voltage $V_{out}$ thereof, and it delivers an "H" (high) level when the converse is true. Accordingly, when the input voltage $V_{in}$ is higher, that is, when the step-down operation is to be performed, the output of the AND gate 15 becomes the "L" level, and the switch (2) 7 becomes normally OFF. In this case, the ON/OFF control of the switch (1) 6 through the OR gate 14 is performed by the output of the comparator 12, and the operations shown in FIGS. 20A and 20B are realized.

In contrast, when the output voltage $V_{out}$ is higher than the input voltage $V_{in}$, the output of the switch controller 13 becomes the "H" level, the switch (1) 6 is held normally ON by the control through the OR gate 14, and the switch (2) 7 is submitted to the ON/OFF control through the AND gate 15 by the output of the comparator 12. Thus, the operations of the step-up type explained in conjunction with FIGS. 22A and 22B are realized. The operations of the error amplifier 10, oscillator 11 and comparator 12 resemble the operations in the prior-art converter of FIG. 15, and the details thereof will be explained in conjunction with FIG. 3 below.

Here, the converter has been described as being subject to the control of holding the switch (2) 7 normally OFF when the input voltage is higher than the output voltage, and the control of holding the switch (1) 6 normally ON when the output voltage is higher than the input voltage. In an actual converter, however, only either of the controls may well be performed.

Figure 3:
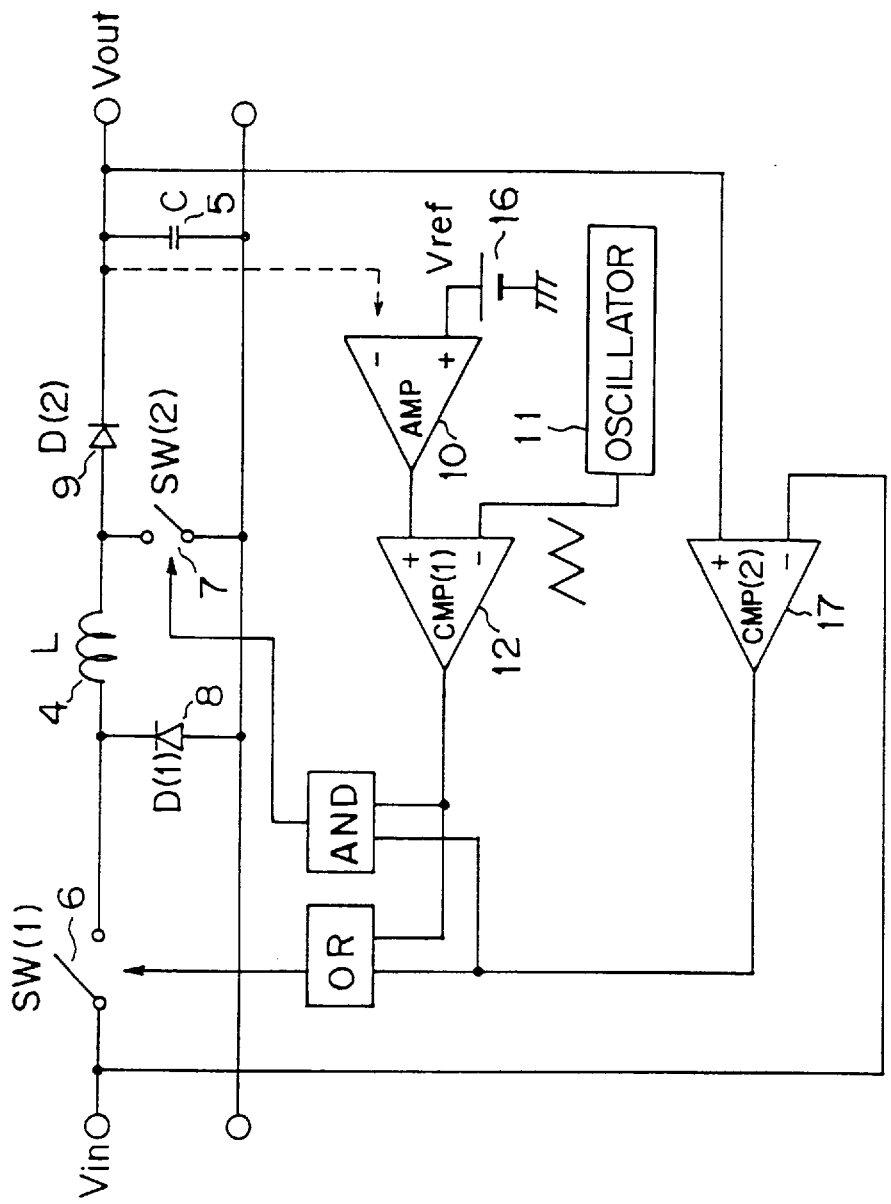
FIG. 3 is a circuit diagram showing the first embodiment of the step-up/down DC/DC converter.

FIG. 3 illustrates the first embodiment of the step-up/down DC/DC converter of the present invention. In the embodiment of FIG. 3, the switch controller 13 in FIG. 2 is constructed of a switch controlling comparator 17. As explained in conjunction with FIG. 2, the switch controlling comparator 17 functions to compare the input voltage $V_{in}$ and the output voltage $V_{out}$. It also functions to deliver the "L" level for the input voltage $V_{in}$ being higher than the output voltage $V_{out}$, and the "H" level in the converse case.

Figure 15:
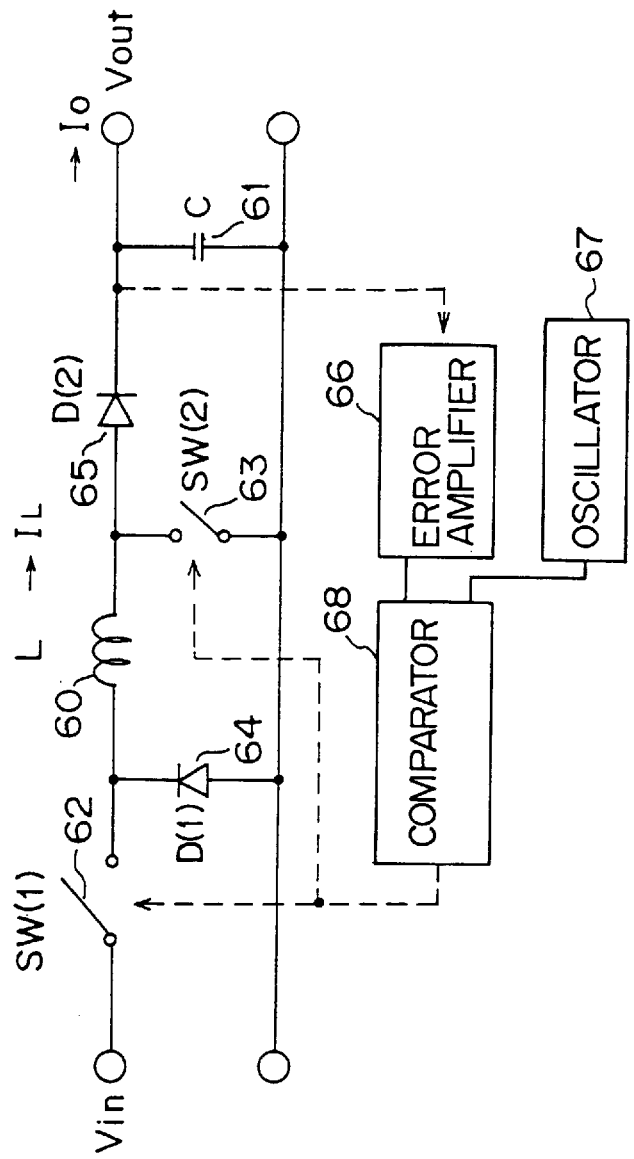
FIG. 15 is a diagram showing an example of construction of a step-up/down DC/DC converter in the prior art.
Figure 16:
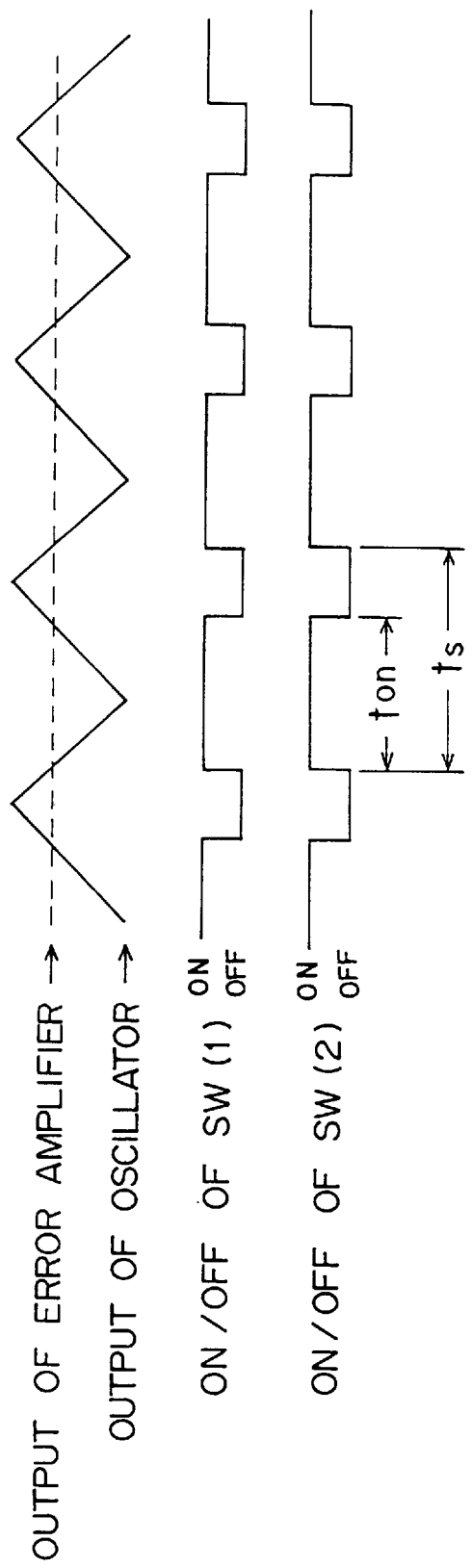
FIG. 16 is a diagram for explaining an ON/OFF signal for two switches in FIG. 15.
Figures 17A, 17B:
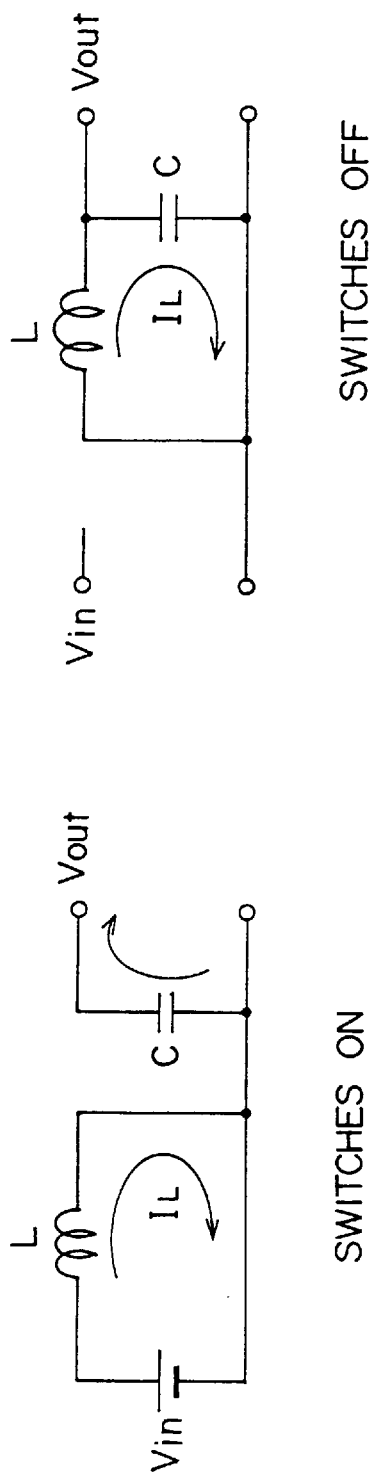
FIGS. 17A and 17B are diagrams for explaining those operations of the step-up/down DC/DC converter in FIG. 15 which proceed when the switches are ON and when they are OFF, respectively.
Figure 18:
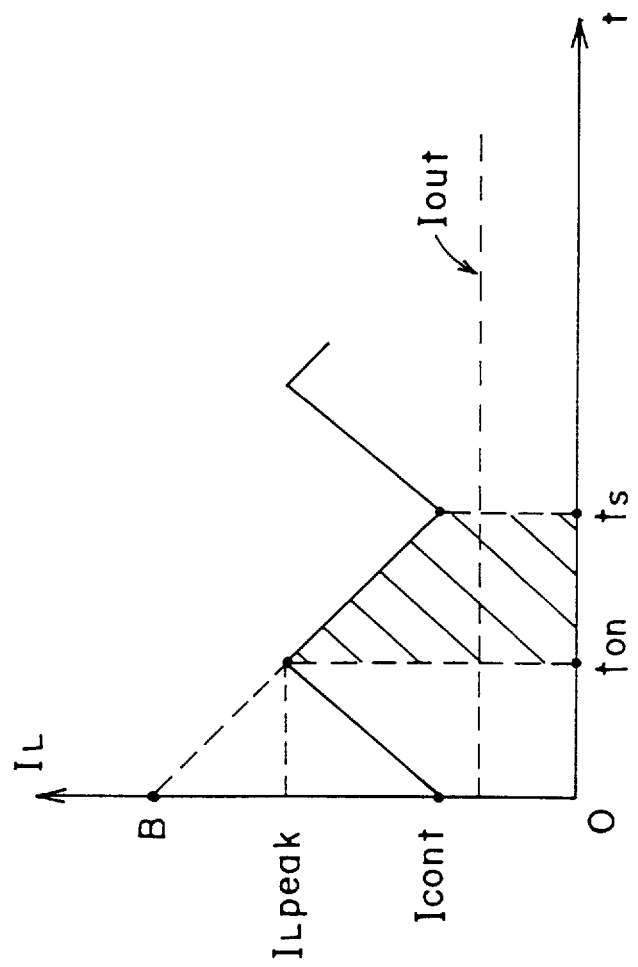
FIG. 18 is a diagram for explaining current which flows through a smoothing reactor in FIG. 15.
Figure 19:
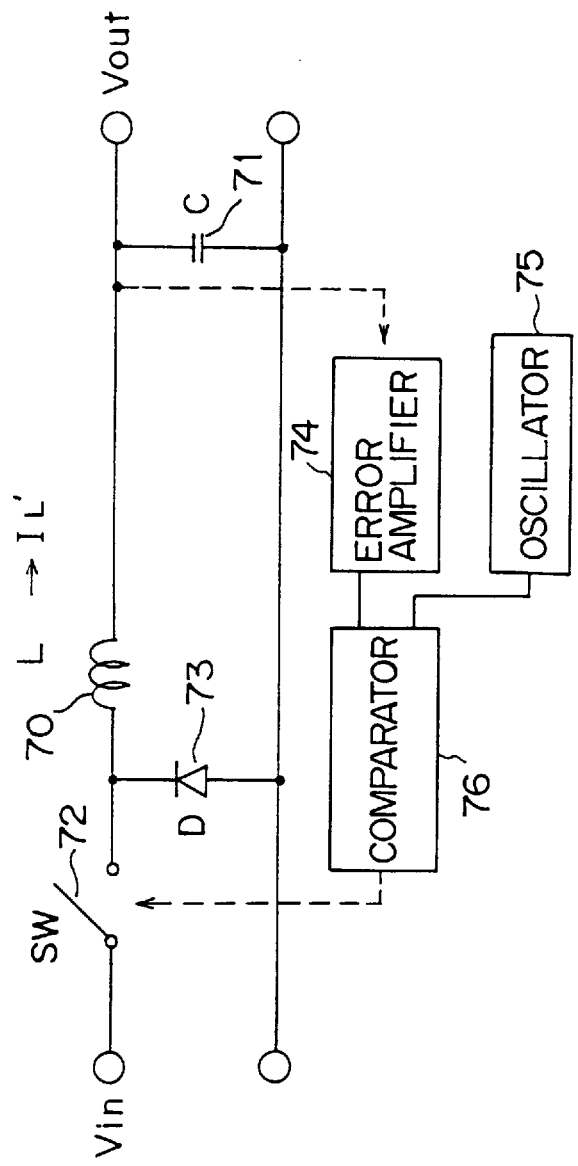
FIG. 19 is a circuit diagram showing an example of construction of a step-down type DC/DC converter in the prior art.

In the embodiment of FIG. 3, the error amplifier 10 functions to compare a certain reference voltage $V_{ref}$ 16 and the output voltage $V_{out}$ and to amplify the error between the voltages, as explained on the error amplifier 66 in FIG. 15. The oscillator 11 functions to generate a triangular wave by way of example, likewise to the oscillator 67 in FIG. 15. The comparator 12 compares the output of the error amplifier 10 with that of the oscillator 11. Then, the ON/OFF signal for turning ON the two switches (1) 6 and (2) 7 is brought to the "H" level when the output of the error amplifier 10 is larger than that of the oscillator 11, in other words, in each interval in which the error amplifier output is larger than the oscillator output as illustrated in FIG. 16. More specifically, in a case where the output voltage $V_{out}$ is low and where the error is large, the output of the error amplifier 10 becomes larger than that of the oscillator 11, and the ON time period $t_{on}$ of the switches (1) 6 and (2) 7 lengthens more.

FIG. 4 is a diagram for explaining the output logical levels of the two comparators (1) 12 and (2) 17 which determine the operational state of the converter in the first embodiment of FIG. 3. As indicated in FIG. 4, the ON/OFF control of the switch (1) 6 is performed by the logical sum of the outputs of the two comparators, and that of the switch (2) 7 is performed by the logical product of the outputs of the two comparators. As a result, the converter executes the step-down operation when the output of the switch controlling comparator 17 or CMP (2) is the "L" level, and it executes the step-up operation when the comparator output is the "H" level.

Figure 5:
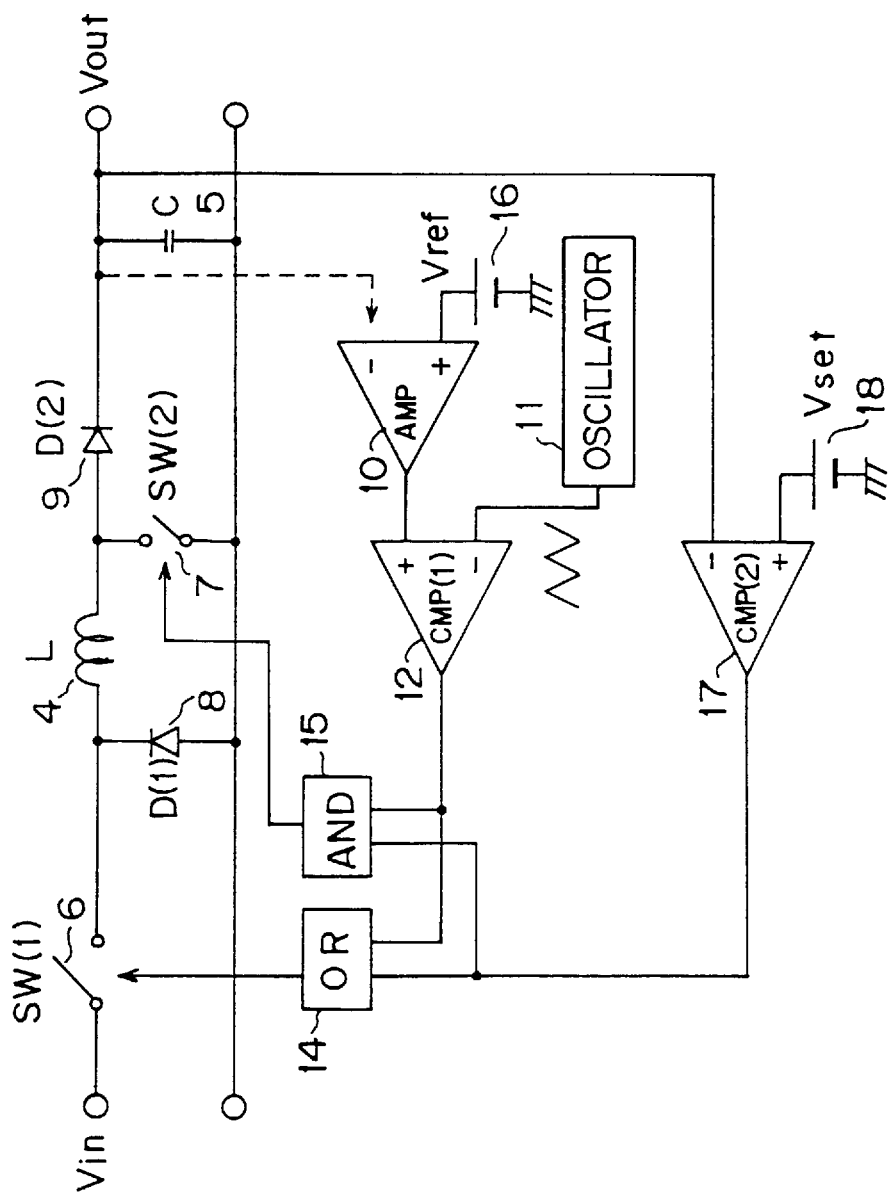
FIG. 5 is a circuit diagram showing the second embodiment of the step-up/down DC/DC converter.

FIG. 5 illustrates the construction of the second embodiment of the step-up/down DC/DC converter. As compared with the first embodiment shown in FIG. 3, the second embodiment shown in FIG. 5 differs only in the point that a certain set voltage $V_{set}$ 18 is connected to the +input terminal of the switch controlling comparator 17, while the output voltage $V_{out}$ of the converter is connected to the −input terminal thereof. Consequently, the switch controlling comparator 17 delivers the "H" level when the set voltage $V_{set}$ is higher than the output voltage $V_{out}$, and it delivers the "L" level in the converse case. Thus, the converter of the second embodiment performs the step-down operation for the output voltage higher than the set voltage and the step-up operation in the converse case.

In this embodiment, however, it is required as an indispensable condition that the output voltage $V_{out}$ be higher than the input voltage $V_{in}$ when the power supply of the converter is turned ON, that is, in a case where the output voltage $V_{out}$ rises from 0 (zero). The reason therefor is that the step-up operation is performed as an operation starting mode at the time of the turn-ON of the power supply, and that the output voltage overshoots in a case where the input voltage is higher than the output voltage.

Figure 6:
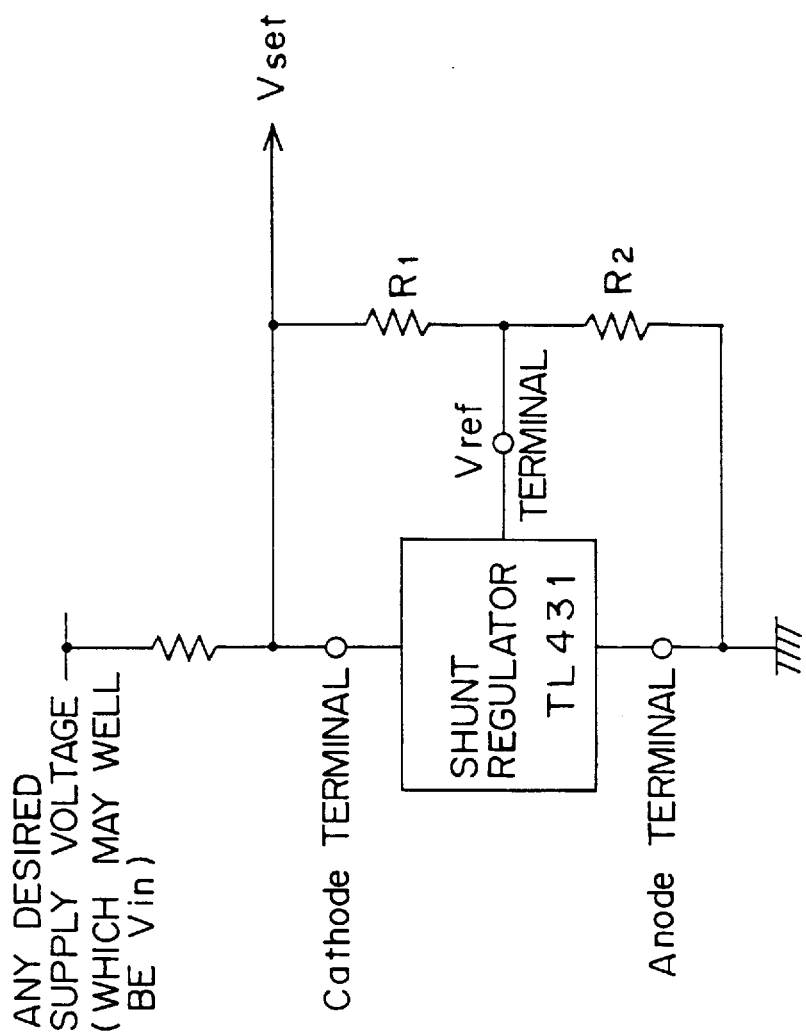
FIG. 6 is a diagram for explaining a method of setting any desired voltage by the use of a shunt regulator.

Although the certain set voltage $V_{set}$ is connected to the +terminal of the CMP (2) being the switch controlling comparator 17 in the circuit arrangement of FIG. 5, it is also possible to connect a set voltage to the −terminal side of the CMP (2) contrariwise. In such a case, any desired plus or minus voltage needs to be applied as the set voltage. A method therefor is, for example, an expedient employing a shunt regulator. FIG. 6 is a diagram for explaining the method of setting any desired voltage based on the expedient employing the shunt regulator. In the method of FIG. 6, a control as indicated by the following formula is performed by the shunt regulator ("TL431"):

$$V_{set} \cdot R_2/(R_1+R_2)=V_{ref}$$

Accordingly, the magnitude of the set voltage $V_{set}$ is given by the following expression and can be set as desired:

$$V_{set}=V_{ref}(R_1+R_2)/R_2$$

Figure 7:
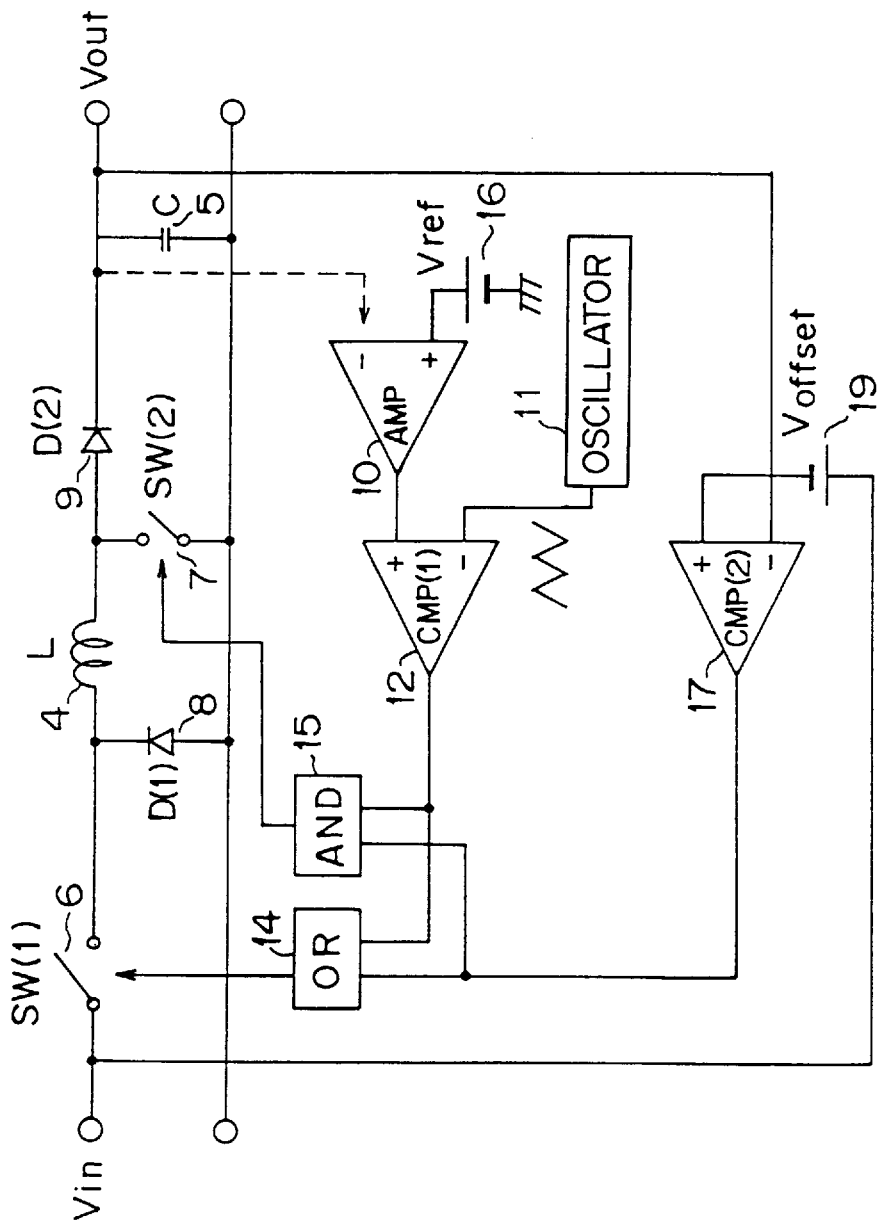
FIG. 7 is a circuit diagram showing the third embodiment of the step-up/down DC/DC converter.

FIG. 7 illustrates the construction of the third embodiment of the step-up/down DC/DC converter. As compared with the first embodiment shown in FIG. 3, the third embodiment shown in FIG. 7 also differs in the method of connecting the input terminals of the switch controlling comparator 17. More specifically, the input voltage $V_{in}$ is connected through an offset voltage $V_{offset}$ 19 to the +input terminal of the CMP (2) being the switch controlling comparator 17, while the output voltage $V_{out}$ is connected to the −input terminal. Thus, the CMP (2) delivers the "L" level when the difference between the input voltage and the offset voltage is higher than the output voltage, and it delivers the "H" level in the converse case.

The operation of the third embodiment will be described in comparison with that of the first embodiment shown in FIG. 3. In the circuit arrangement of FIG. 3, at the time of the turn-ON of the power supply, the output voltage rises from 0 (zero). In general, therefore, the input voltage is higher than the output voltage, and the converter performs the step-down operation. With the lapse of time, the input voltage rises gradually until it approaches the reference voltage of the output voltage. On this occasion, however, the state in which the input voltage and the output voltage are in perfect agreement is not established on account of a voltage drop ascribable to the smoothing reactor L 4 and the diode (2) 9. Therefore, the output of the CMP (2) 17 remains in the "L" status.

Figure 8:
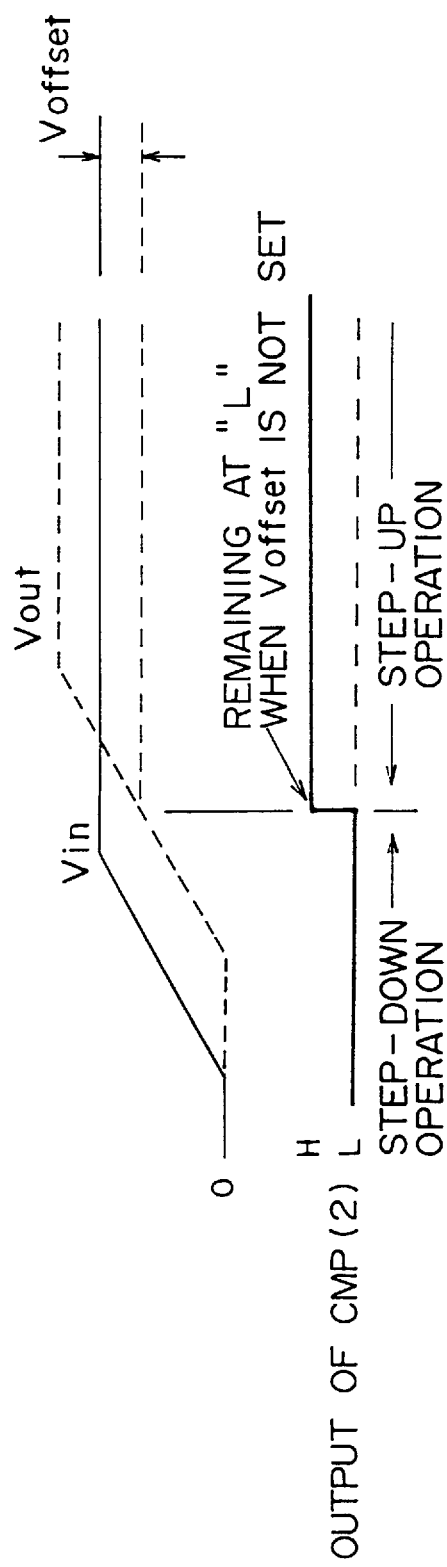
FIG. 8 is a diagram for explaining the operation of the third embodiment at the turn-ON of power supply.

FIG. 8 is a diagram for explaining such a state. Referring to the figure, broken lines indicate a case where no offset voltage is set as in the circuit arrangement of FIG. 3. In this case, the output of the CMP (2) 17 remains at the "L" level. In contrast, the circuit arrangement of FIG. 7 affords the offset voltage $V_{offset}$ which is, at least, equal to the voltage drop ascribable to the smoothing reactor L 4 and the diode (2) 9. In this way, at the point of time at which the output voltage $V_{out}$ has become higher than the difference between the input voltage $V_{in}$ and the offset voltage $V_{offset}$, the output of the CMP (2) 17 changes from the "L" status into the "H" status, and the converter shifts to the step-up operation.

Figure 9:
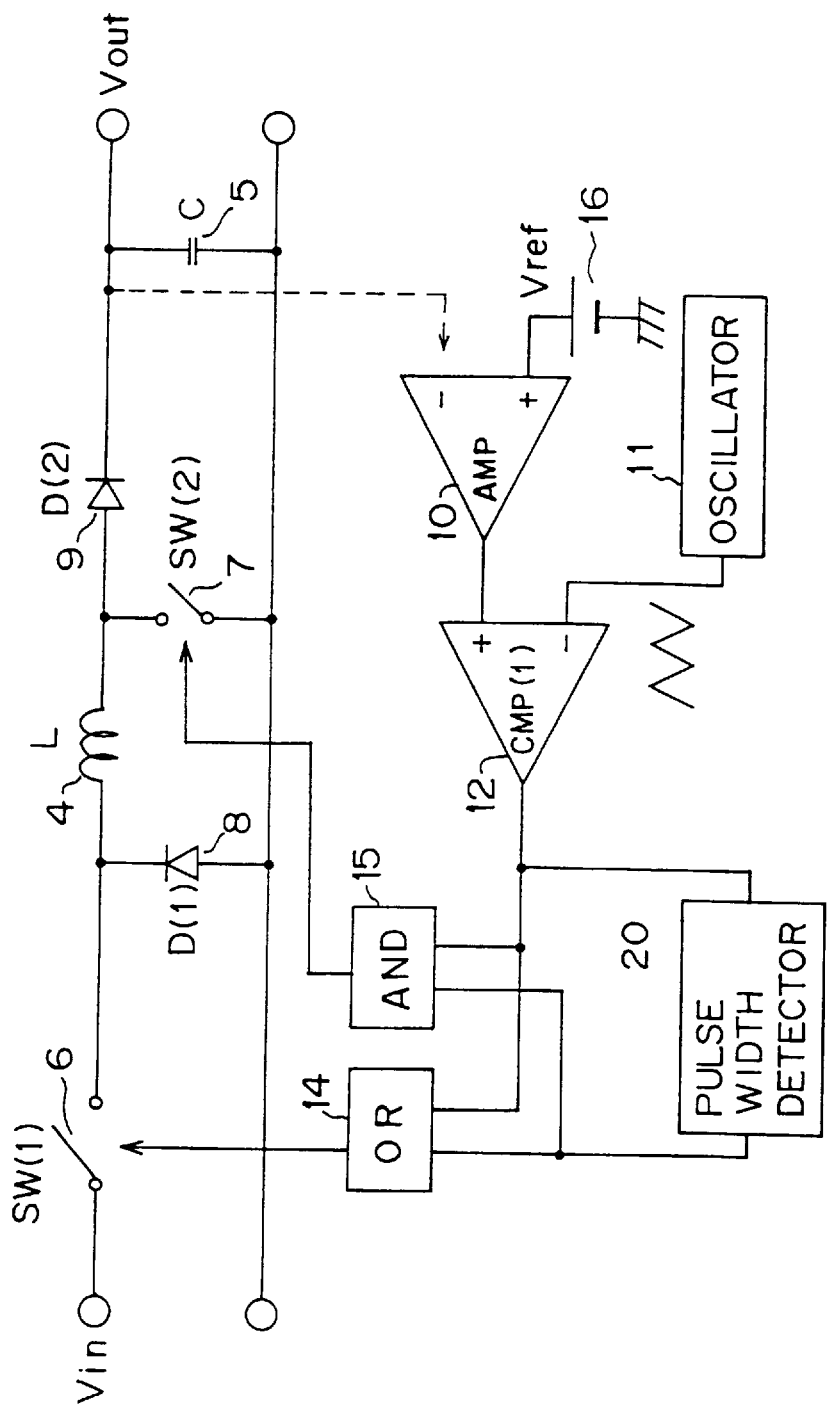
FIG. 9 is a circuit diagram showing the fourth embodiment of the step-up/down DC/DC converter.

FIG. 9 illustrates the construction of the fourth embodiment of the step-up/down DC/DC converter. This embodiment differs from the first embodiment of FIG. 3 in the point that the switch controlling comparator 17 in FIG. 3 is replaced with a pulse width detector 20 which is interposed between the output side of the comparator (1) 12 and the input side of the OR gate 14 as well as the AND gate 15. With note taken of the ON-duty factor of the output signal of the comparator 12 or CMP (1), the pulse width detector 20 controls the step-down and step-up operations of the converter by detecting the respective points of time at which the ON-duty factor has become 0 [%] and 100 [%].

Figure 10:
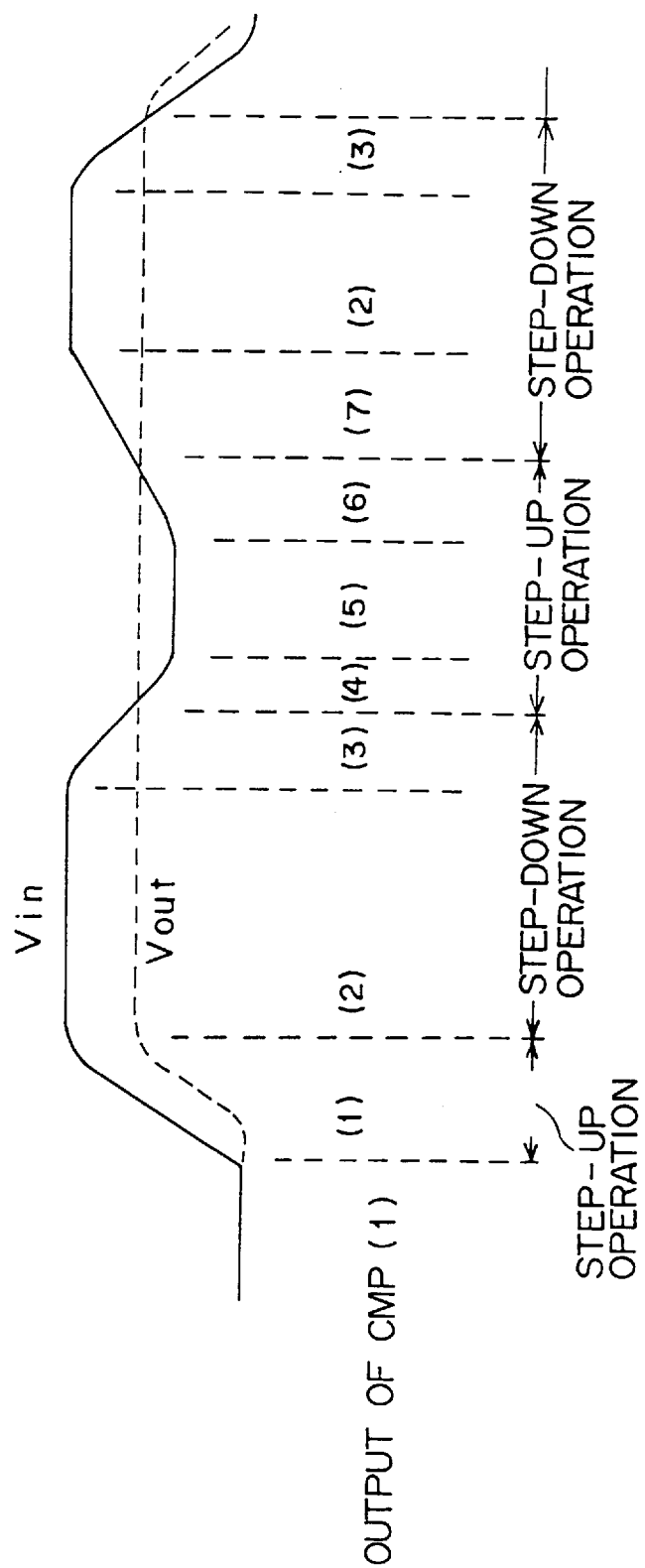
FIG. 10 is a diagram for explaining the relation of the operation of the converter with the ON-duty factor of the output of a comparator in FIG. 9.

FIG. 10 is a diagram for explaining the relationship between the ON-duty factor of the output of the CMP(1) 12 in FIG. 9 and the step-up/down operations of the fourth embodiment of the converter. Here, the expression "ON-duty factor" signifies the rate (in %) between the ON time period of the output of the comparator CMP(1) 12 and the oscillation cycle of the oscillator 11.

Referring to FIG. 10, the ON-duty factor of the output of the comparator 12 is 100 [%] at the beginning of a time period (1), namely, at the turn-ON of the power supply. The reason therefor is that, at the turn-ON of the power supply, the output voltage $V_{out}$ is rapidly raised by setting the ON-duty factor at 100 [%]. As will be stated later, when the ON-duty factor of the output of the comparator 12 is 100 [%], the output of the pulse width detector 20 is at the "H" level, and hence, the converter performs the step-up operation. At the last of the time period (1), the ON-duty factor decreases quickly and becomes 0 [%] once. At this time, the output of the pulse width detector 20 becomes the "L" level, and the converter shifts to the step-down operation.

During a time period (2), the converter performs the step-down operation, and the ON-duty factor is constant and is equal to the ratio between the output voltage $V_{out}$ and the input voltage $V_{in}$.

In a time period (3), the ON-duty factor enlarges gradually with decrease in the input voltage $V_{in}$, and it becomes 100 [%] when the input voltage $V_{in}$ has equalized to the output voltage $V_{out}$. The step-down operation is ended at this time, and is shifted to the step-up operation during a time period (4), et seq.

In the time period (4), the ON-duty factor enlarges gradually from 0 [%], and the output voltage $V_{out}$ approaches a predetermined value. During a time period (5), the ON-duty factor is held constant at a value which is obtained by subtracting the ratio of the input voltage $V_{in}$ and the output voltage $V_{out}$ from 1 (one).

In a time period (6), the ON-duty factor becomes smaller gradually with increase in the input voltage $V_{in}$, and it becomes 0 [%] when the input voltage $V_{in}$ and the output voltage $V_{out}$ have agreed. In the subsequent time period (7), the ON-duty factor becomes smaller gradually from 100 [%] in the same manner as in the time period (1).

In the relationship of FIG. 10, the shifts from the step-up operation to the step-down operation occur between the time periods (1) and (2) and between the time periods (6) and (7), and the condition of such a shift is that the ON-duty factor becomes smaller gradually down to the final value of 0 [%]. Further, the shift from the step-down operation to the step-up operation occurs between the time periods (3) and (4), and the condition thereof is that the ON-duty factor enlarges gradually down to the final value of 100 [%]. It is accordingly required of the pulse width detector 20 to change-over the step-up operation to the step-down operation upon detecting the arrival of the ON-duty factor at 0 [%], and to change-over the step-down operation to the step-up operation upon detecting the arrival of the ON-duty factor at 100 [%].

Figure 11:
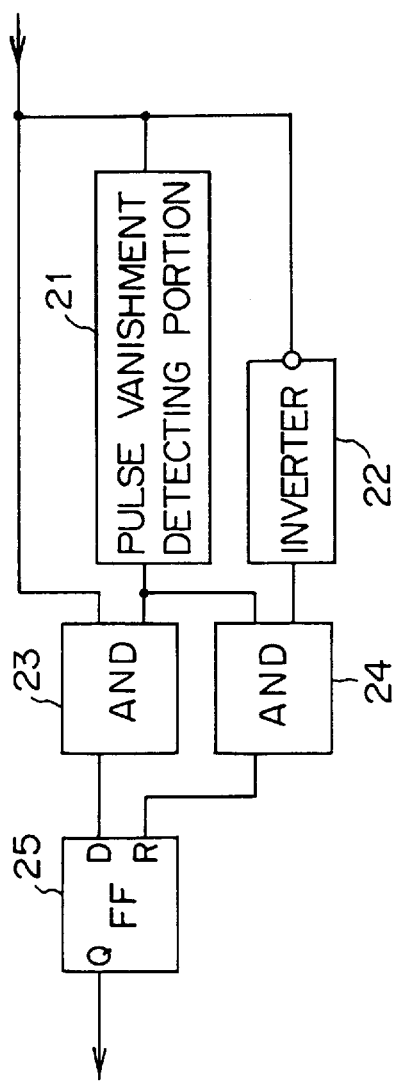
FIG. 11 is a circuit diagram showing an example of construction of a pulse width detector.

FIG. 11 illustrates an example of construction of the pulse width detector 20 shown in FIG. 9. Referring to FIG. 11, the pulse width detector 20 is configured of a pulse vanishment detecting portion 21 which detects the vanishment of the output pulse of the comparator 12, an inverter 22, two AND gates 23 and 24, and a flip-flop circuit 25.

FIG. 12 is the operational truth table of the pulse width detector exemplified in FIG. 11. Referring to FIG. 12, the pulse vanishment detecting portion 21 delivers the "H" level when the ON-duty factor has become 0 [%] or 100 [%], and it delivers the "L" level at any other time. In the case where the ON-duty factor has become 0 [%], the output of the pulse vanishment detecting portion 21 is the "H" level, and that of the comparator 12 is the "L" level. On this occasion, the flip-flop circuit 25 is reset through the AND gate 24, and the output of the pulse width detector becomes the "L" level. While the ON-duty factor is augmenting from 0 [%], the output of the pulse vanishment detecting portion 21 is at the "L" level, and both the outputs of the two AND gates 23 and 24 become the "L" level, so that the output of the pulse width detector is held at the "L" level.

When the ON-duty factor has reached 100 [%], both the outputs of the pulse vanishment detecting portion 21 and the comparator 12 become the "H" level, and the flip-flop circuit 25 is set through the AND gate 23 to generate the "H" level as its output. While the ON-duty factor is diminishing from 100 [%], the output of the pulse vanishment detecting portion 21 is at the "L" level, and the flip-flop circuit 25 has its output held at the "H" level without being reset by the AND gate 24.

Figure 13B:
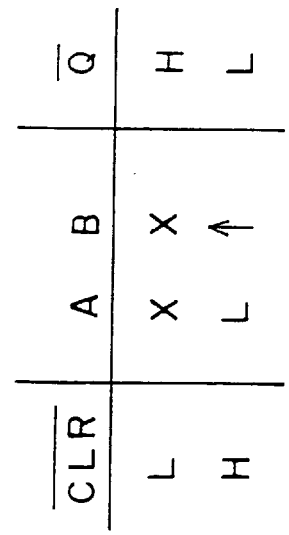
FIGS. 13A and 13B are diagrams showing an example of construction of a pulse vanishment detecting portion in FIG. 11.
Figure 13A:
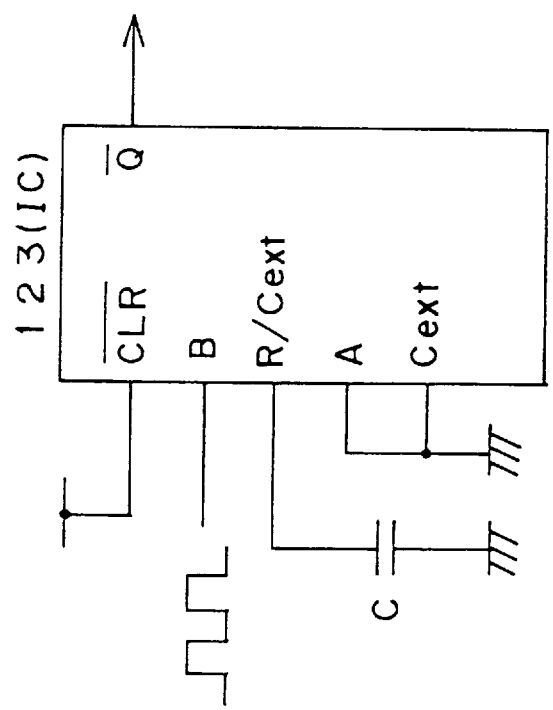
Figure 14:
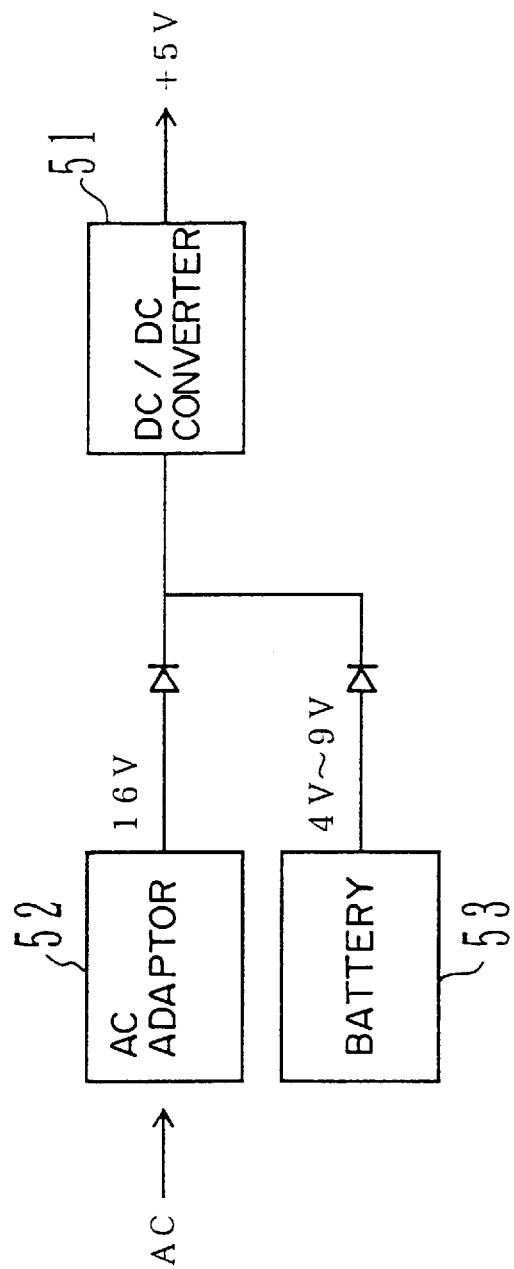
FIG. 14 is a diagram showing an example of use of a DC/DC converter.

FIGS. 13A and 13B illustrates an example of construction of the pulse vanishment detecting portion 21 shown in FIG. 11. As shown in FIG. 13A, the pulse vanishment detecting portion 21 is constructed of a single IC (integrated circuit) ("μPD74HC123A" fabricated by NEC) by way of example. As indicated in FIG. 13B, the operation of the portion 21 is such that, when the rise of an input pulse to the terminal B of the IC has been detected, the output terminal $\overline{Q}$ thereof produces the "L" level for a certain predetermined time period (which is set by a capacitor C). Accordingly, the output $\overline{Q}$ becomes the "H" level when quite no pulse has come to exist in accordance with the ON-duty factor of 0 [%] or 100 [%].

As described above in detail, according to the present invention, a step-up/down DC/DC converter is controlled on the basis of the comparison between, for example, the input voltage and output voltage of the converter so as to bring the converter into a step-down operation state when the input voltage is higher than the output voltage. Thus, a peak current and a ripple current which flow through a smoothing reactor included in the converter can be suppressed, and it is permitted to provide a DC/DC converter of high efficiency.

What is claimed is:

1. In a DC-to-DC (expressed as "DC/DC" below) converter as to which a varying range of an input voltage not stabilized contains a value of an output voltage stabilized, and which requires both operations of step-up and step-down;

a step-up/down DC/DC converter comprising:
    voltage comparison means for comparing the input voltage and the output voltage; and
    operation changeover control means for controlling changeover of the operations of the DC/DC converter so that said DC/DC converter may perform the step-down operation as the operation of a step-down type converter when a result of the comparison delivered from said voltage comparison means indicates that said input voltage is higher than said output voltage, and that it may perform the step-up operation as the operation of a step-up type converter when the result of said comparison indicates that said output voltage is higher than said input voltage.

2. A step-up/down DC/DC converter as defined in claim 1, comprising a voltage input terminal, a reactor, a voltage output terminal, a first switch which is interposed between said voltage input terminal and said reactor, and a second switch which is interposed between ground and a node of said reactor near to said voltage output terminal;
    said operation changeover control means controlling the first and second switches so that said second switch may become normally OFF in said step-down operation, and that said first switch may become normally OFF in said step-up operation.

3. A step-up/down DC/DC converter as defined in claim 2, wherein said operation changeover control means includes:
    error comparison means for comparing an error between said output voltage and a reference voltage, with a value of a certain voltage; and
    gate means for enabling in said step-down operation the switching control based on an output of said error comparison means for said first switch and the switching control based on the output of said voltage comparison means for said second switch, and for enabling in said step-up operation the switching control based on said output of said voltage comparison means for said first switch and the switching control based on said output of said error comparison means for said second switch.

4. A step-up/down DC/DC converter as defined in claim 3, wherein:
    said error comparison means delivers a signal for turning ON said switches, when the error is larger than the certain voltage value; and
    said voltage comparison means delivers a signal for turning said second switch normally OFF in said step-down operation, and for turning said first switch normally ON in said step-up operation.

5. In a DC/DC converter as to which a varying range of an input voltage not stabilized contains a value of an output voltage stabilized, and which requires both operations of step-up and step-down;

a step-up/down DC/DC converter comprising:
    voltage comparison means for comparing the output voltage and a set voltage correspondent to the input voltage; and
    operation changeover control means for controlling changeover of the operations of the DC/DC converter so that said DC/DC converter may perform the step-down operation as the operation of a step-down type converter when a result of the comparison delivered from said voltage comparison means indicates that the set voltage correspondent to said input voltage is higher than said output voltage, and that it may perform the step-up operation as the operation of a step-up type converter when the result of said comparison indicates that said output voltage is higher than said set voltage correspondent to said input voltage.

6. In a DC/DC converter as to which a varying range of an input voltage not stabilized contains a value of an output voltage stabilized, and which requires both operations of step-up and step-down;

a step-up/down DC/DC converter comprising:
    voltage comparison means for comparing the input voltage and a set voltage correspondent to the output voltage; and
    operation changeover control means for controlling changeover of the operations of the DC/DC converter so that said DC/DC converter may perform the step-down operation as the operation of a step-down type converter when a result of the comparison delivered from said voltage comparison means indicates that said input voltage is higher than the set voltage correspondent to said output voltage, and that it may perform the step-up operation as the operation of a step-up type converter when the result of said comparison indicates that said set voltage correspondent to said output voltage is higher than said input voltage.

7. In a DC/DC converter as to which a varying range of an input voltage not stabilized contains a value of an output voltage stabilized, and which requires both operations of step-up and step-down;

a step-up/down DC/DC converter comprising:
    voltage comparison means for comparing the output voltage and a voltage value with an offset bestowed on the input voltage; and
    operation changeover control means for controlling changeover of the operations of the DC/DC converter so that said DC/DC converter may perform the step-down operation as the operation of a step-down type converter when a result of the comparison delivered from said voltage comparison means indicates that the voltage value with the offset bestowed on said input voltage is larger than said output voltage, and that it may perform the step-up operation as the operation of a step-up type converter when the result of said comparison indicates that said output voltage is larger than said voltage value with said offset bestowed on said input voltage.

8. In a DC/DC converter as to which a varying range of an input voltage not stabilized contains a value of an output voltage stabilized, and which requires both operations of step-up and step-down;

a step-up/down DC/DC converter comprising:
    voltage comparison means for comparing the input voltage and a voltage value with an offset bestowed on the output voltage; and operation changeover control means for controlling changeover of the operations of the DC/DC converter so that said DC/DC converter may perform the step-down operation as the operation of a step-down type converter when a result of the comparison delivered from said voltage comparison means indicates that said input voltage is larger than the voltage value with the offset bestowed on said output voltage, and that it may perform the step-up operation as the operation of a step-up type converter when the result of said comparison indicates that said voltage value with said offset bestowed on said output voltage is larger than said input voltage.

9. In a DC/DC converter as to which a varying range of an input voltage not stabilized contains a value of an output voltage stabilized, and which requires both operations of step-up and step-down;

a step-up/down DC/DC converter comprising:

error comparison means for comparing an error between the output voltage and a reference voltage, with an oscillation voltage of a certain oscillator; and control means for controlling the operations of the DC/DC converter so that said DC/DC converter may start the step-down operation as the operation of a step-down type converter when a duty factor of a pulse wave delivered from said error comparison means has reached 0 [%], and that it may start the step-up operation as the operation of a step-up type converter when the duty factor has reached 100 [%].

10. A step-up/down DC/DC converter as defined in claim 9, comprising a voltage input terminal, a reactor, a voltage output terminal, a first switch which is interposed between said voltage input terminal and said reactor, and a second switch which is interposed between ground and a node of said reactor near to said voltage output terminal;

said control means including switching-control-signal output means for delivering a switching control signal which turns said second switch normally OFF in said step-down operation, and which turns said first switch normally ON in said step-up operation.

11. A step-up/down DC/DC converter as defined in claim 10, wherein said control means further includes:

gate means for enabling in said step-down operation the switching control based on the output of said error comparison means for said first switch and the switching control based on the output of said switching-control-signal output means for said second switch, and for enabling in said step-up operation the switching control based on said output of said switching-control-signal output means for said first switch and the switching control based on said output of said error comparison means for said second switch.

12. A step-up/down DC/DC converter as defined in claim 11, wherein said error comparison means brings the value of the pulse wave to an "H" (high) level, thereby to deliver a signal for turning ON said switches, when the error is larger than the oscillation voltage.

* * * * *

UNITED STATES PATENT AND TRADEMARK OFFICE
CERTIFICATE OF CORRECTION

| | |
|---|---|
| PATENT NO. | : 5,831,418 |
| APPLICATION NO. | : 08/889873 |
| DATED | : November 3, 1998 |
| INVENTOR(S) | : Seiya Kitagawa |

Page 1 of 1

It is certified that error appears in the above-identified patent and that said Letters Patent is hereby corrected as shown below:

In the Claims

Please replace "OFF" with --ON-- in the last line of claim 2 at column 11, line 40.

Signed and Sealed this
Nineteenth Day of August, 2014

Michelle K. Lee
*Deputy Director of the United States Patent and Trademark Office*